United States Patent [19]

Gilson

[11] 4,231,496
[45] Nov. 4, 1980

[54] FOOD DISPENSING UTENSIL

[76] Inventor: Channing W. Gilson, 2046 Hillhurst Ave., Los Angeles, Calif. 90027

[21] Appl. No.: 26,339

[22] Filed: Apr. 2, 1979

[51] Int. Cl.³ .............................................. B44D 3/40
[52] U.S. Cl. ................................... 222/414; 294/1 R
[58] Field of Search ...................... 294/55, 1; 222/167, 222/414; D1/22; 426/134

[56] References Cited

U.S. PATENT DOCUMENTS 3,592,366  7/1971  Markley .............................. 222/414

FOREIGN PATENT DOCUMENTS 1115861  5/1968  United Kingdom ..................... 222/414

Primary Examiner—James B. Marbert
Attorney, Agent, or Firm—Donald D. Mon

[57] ABSTRACT

A hand-held food dispensing utensil comprised of a cup with a handle having a hollow cylindrical ring rotatably supported in the cup. A container or containers fit in the hollow portion of the ring. The containers have a liquid or dry mix food product stored therein which can be released to flow into a trough in the bottom of the cup. The food product is transferred to the ring by rotating it so its outer surface moves through the product. This is accomplished by manipulation by the tongue, by the hand, or by a linkage system. Rotation of the ring transfers the food product to the ring and can be removed from the ring by the tongue. A handle may be integral or provided by a replaceable pressurized container attached to the cup and containing a food product such as whipped cream which is released into the bottom of the cup by a trigger mechanism. The ring can be chilled so as to freeze or congeal previously-liquid material, such as ice-milk or ice cream mix, or can be heated to heat foods such as soups and hot chocolate. Its heat capacity tends to maintain foods at some agreeable or suitable temperature, and some at agreeable or suitable viscosities and textures. Some or all of the utensil parts can be made disposable for convenience.

34 Claims, 39 Drawing Figures

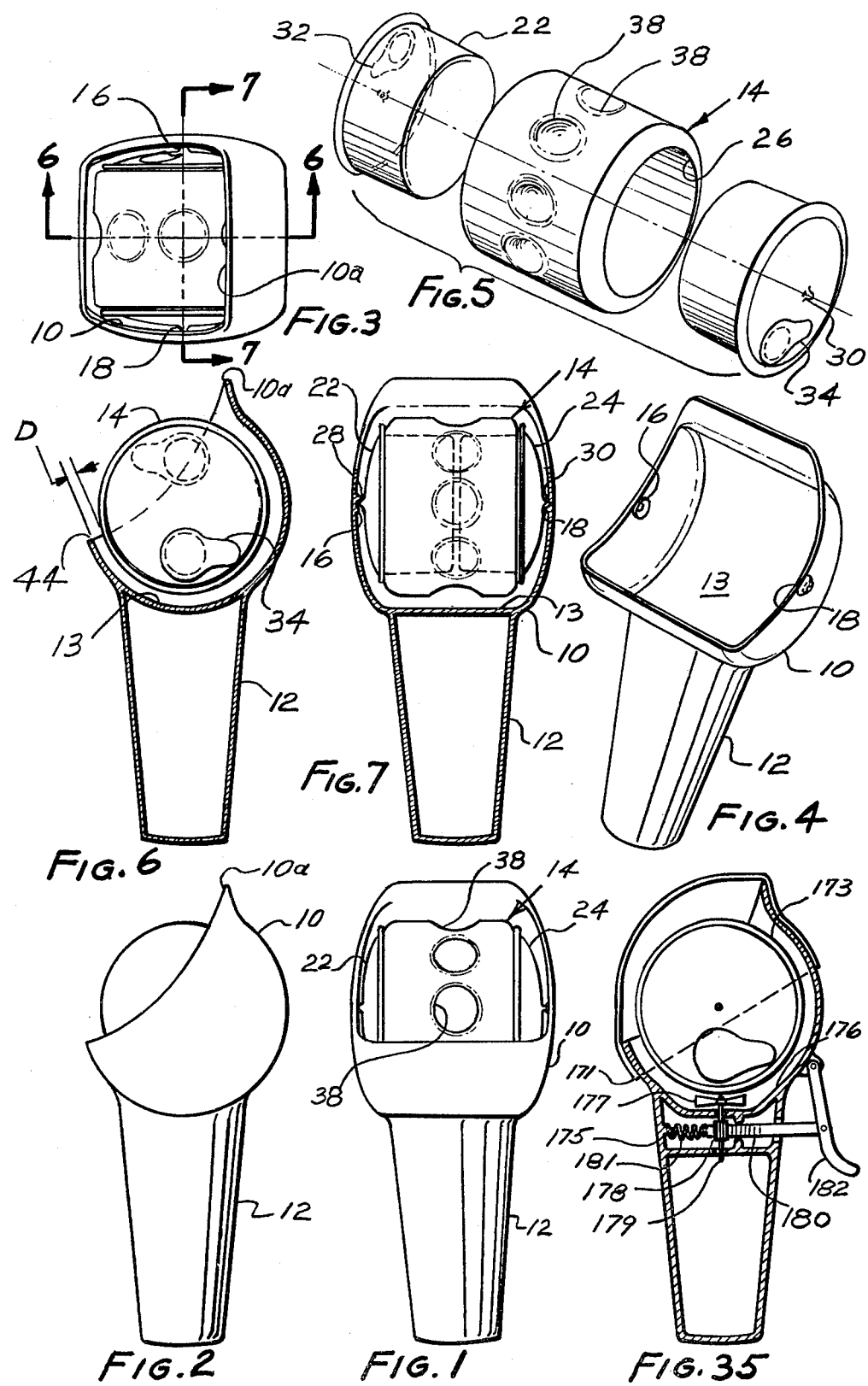

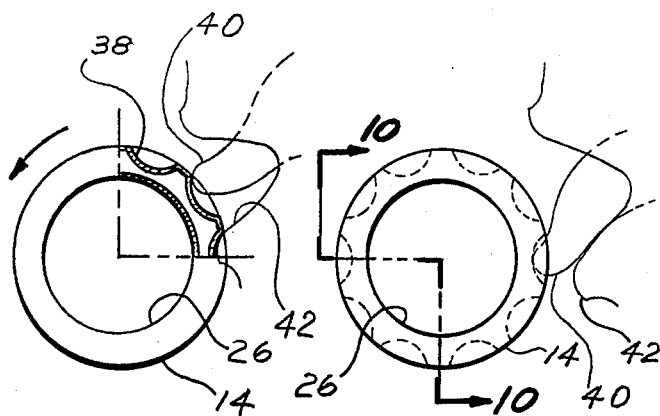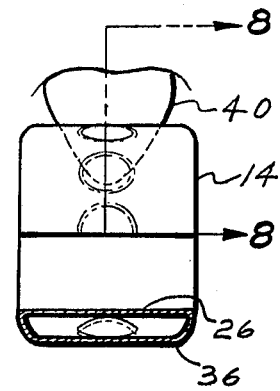
FIG.8   FIG.9   FIG.10
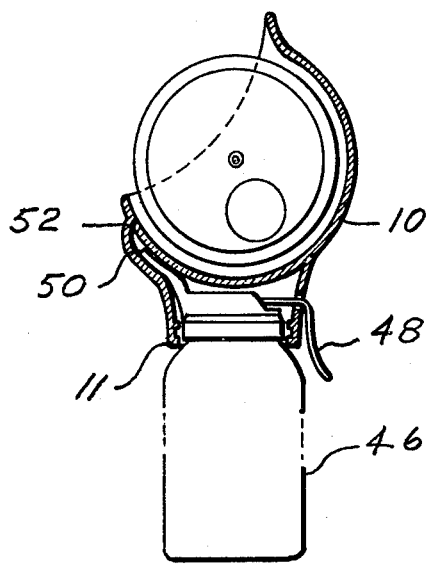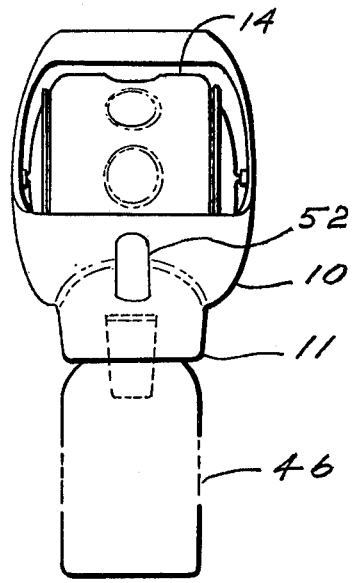
FIG.12   FIG.11
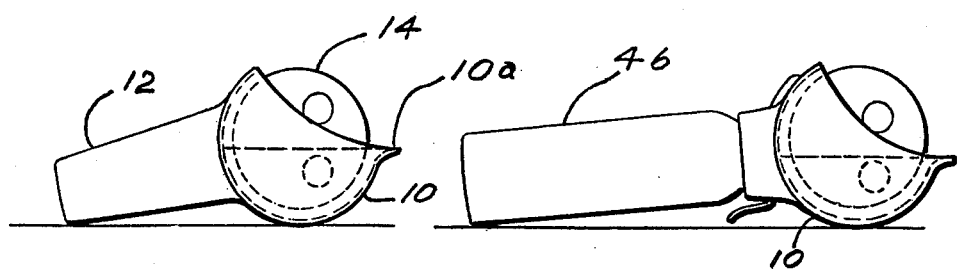
FIG.13   FIG.14

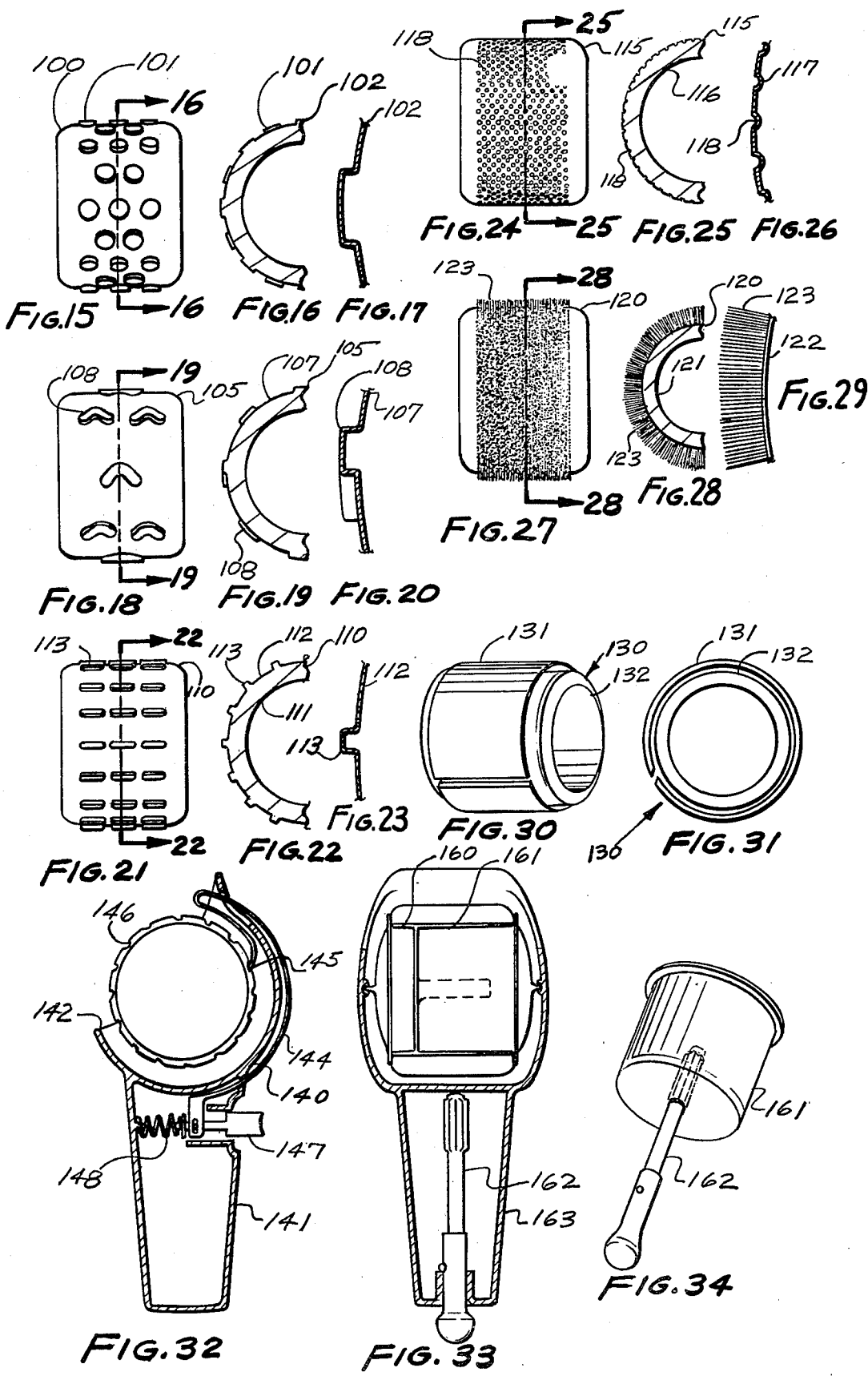

FOOD DISPENSING UTENSIL

BACKGROUND OF THE INVENTION

This invention relates generally to eating utensils and more particularly relates to a hand-held eating utensil which dispenses individual servings in response to actuation by the tongue. It can also serve to warm or to keep warm some foods, or to freeze or to congeal a previously-liquid product to be dispensed.

In the case of ice cream or ice milk it is now necessary to remove the bulk product from a hard packed, frozen package with either an ice cream scoop or a large strong spoon and serve it in a dish from which it is consumed with a spoon. The bulk product must then be replaced in the freezer. If sauces such as chocolate syrup are added, then a can of it needs to be opened, poured, recovered, and replaced in the refrigerator. If whipped cream is used, then either fresh, heavy cream needs to be beaten and spooned onto the serving or be added from a pressurized container.

Another disadvantage is that the retail cost of bulk ice milk (or ice cream) is roughly thirty percent (30%) more expensive than ice milk mix liquid. Also, considering that one gallon of liquid freezes into more than one gallon of ice milk or ice cream—50% to 100% or more over-run (which is air) is normal. Then each of the twenty 3.2 ounce servings obtainable from one gallon of frozen bulk ice milk cost $0.09. However, if one gallon of liquid ice-milk is used, it will serve 45 people the same serving, but at a cost of only $0.064 per serving. The utensil of this invention enables this type of portion to be served on an individual basis.

Furthermore, the above is accomplished without requiring strong muscular force. It offers the additional advantage that additives such as whipped cream and chocolate sauce can "come out even" at the end of the serving.

Individual servings of ice cream can also be provided by means of cones which also have some disadvantages. Cones usually may not easily be put down. Even if a cone has a flat bottom, it is precariously balanced, and melting ice cream can run down its side, creating a mess on a table or other surface. Furthermore, cones themselves used as handles are helpful, but they sometimes soften too soon, and also can break or crumble. Furthermore, cones are not always dependable. The ice cream can and sometimes does fall off. Nor are cones always eaten, because their taste and texture is not always flavorful or desirable so the cone is discarded.

SUMMARY OF THE INVENTION

The purpose of the present invention is to provide an improved method for dispensing food products, and especially for serving and eating foods to be warmed or cooled, for example soups and cold liquid, semi-liquid or semi-frozen food, in single or individual servings.

The food dispensing utensil of the present invention can be made somewhat similar to an ice cream cone in general appearance. It may have a truncated conical handle which supports an open cup at the top. The bottom of the cup is formed as a trough. A hollow ring is rotatably fitted in the cup so its outer surface can move through the food product in the trough, and can be exposed to the tongue at the opening of the cup. Fitting within the hollow ring are one or more food product containers for holding food products such as ice milk mix, chocolate sauce, soup, dry mix foods or chocolate drink which may be released into the cup. Conventional pull tabs can be provided for containing and for releasing the contents of the container.

According to a preferred but optional feature of the invention, the hollow ring has a heavy wall or double wall construction with a substantial heat content. Conveniently, if double walled it can contain a long time period temperature-holding medium which is freezeable or heatable. If not hollow, it can be made of a material having sufficient mass and specific heat to exert a substantial heating, chilling, freezing, or congealing effect. Such a ring can be placed in a freezer to chill it, or in hot or boiling water to heat it. Foods in their containers may then be inserted into the hollow portion of the ring which assembly is then supported in the pivots in the cup. When the liquid is released from the containers into the trough at the bottom of the cup the liquid mix will, if the ring is chilled, freeze or congeal as a thin layer on the surface of the ring. If the ring is heated, the food will be heated. The ring can be rotated, and rotation of the ring continuously brings the food layer to the tongue. If chocolate sauce or some other additive is used in one of the two containers (called "mix packs") then rotation causes the sauce to run over the product on the ring, mixing much as it does on a conventional spoon-eaten ice cream sundae—when ice milk is used, the appearance and taste are strikingly similar.

According to preferred but optional features of the invention, the ring can be provided with depressions to facilitate rotation of the ring by the tongue, or with ratchet or other types of drive means, as well to provide uni-directional rotation detents.

According to yet another preferred but optional feature of the invention, the bottom of the cup may be provided with a cylindrical socket for attachment of a pressurized container. Materials such as whipped cream may be supplied in this way. The device will include a trigger to open the can's valve and release the product into the trough. The pressurized container can even be used as a handle for the food dispensing utensil. When the whipped cream pressure can is used as a handle, a non-dairy product topping or real whipped cream is instantly made available at the nearest point to the mouth simply by pulling the finger-actuated trigger on the valve.

The above and other features of the invention will be fully understood from the following detailed description and the accompanying drawings, in which:

BRIEF DESCRIPTION OF THE DRAWINGS

FIG. 1 is a front view of the presently preferred embodiment of a food dispensing utensil according to the invention;

FIG. 2 is a side view of the food dispensing utensil of FIG. 1;

FIG. 3 is a top view of FIG. 1;

FIG. 4 is a perspective view of the cup and handle of the food dispensing utensil;

FIG. 5 illustrates the assembly of a dispensing ring and food product container;

FIG. 6 is a section view of the food dispensing utensil taken at line 6—6 in FIG. 3;

FIG. 7 is a sectional view of the food dispensing utensil taken at line 7—7 of FIG. 3;

FIGS. 8 and 9 illustrate one operation of the dispensing ring of the food dispensing utensil;

FIG. 10 is a section view of the dispensing ring taken at line 10—10 of FIG. 9;

FIG. 11 is a front view of another embodiment of food dispensing utensil according to the invention;

FIG. 12 is a sectional side elevation of the food dispensing utensil of FIG. 11;

FIGS. 13 and 14 illustrates how the food dispensing utensil may be laid down without spilling.

FIG. 15 is a side elevation of another embodiment of ring according to the invention;

FIG. 16 is a partial cross-section taken at line 16—16 in FIG. 15;

FIG. 17 is an enlarged fragmentary view of part of FIG. 16;

FIG. 18 is a side view of yet another embodiment of ring according to the invention;

FIG. 19 is a partial cross-section taken at line 19—19 in FIG. 18;

FIG. 20 is an enlarged fragmentary view of part of FIG. 18;

FIG. 21 is a side view of yet another embodiment of ring according to the invention;

FIG. 22 is a partial cross-section taken at line 22—22 in FIG. 21;

FIG. 23 is an enlarged fragmentary view of part of FIG. 22;

FIG. 24 is a side view of yet another embodiment of ring according to the invention;

FIG. 25 is a partial cross-section taken at line 25—25 in FIG. 24;

FIG. 26 is an enlarged fragmentary view of part of FIG. 25;

FIG. 27 is a side view of still another embodiment of ring according to the invention;

FIG. 28 is a partial cross-section taken at line 28—28 in FIG. 27;

FIG. 29 is an enlarged fragmentary view of part of FIG. 28;

FIG. 30 is still another embodiment of ring according to the invention;

FIG. 31 is a right-hand end view of FIG. 30;

FIG. 32 is an axial view showing still another embodiment of the invention;

FIG. 33 is an axial view of yet another embodiment of the invention;

FIG. 34 is a perspective view showing part of the device of FIG. 33 in use;

FIG. 35 is an axial cross-section showing still another embodiment of the invention;

DESCRIPTION OF THE PREFERRED EMBODIMENT

Figure 36:
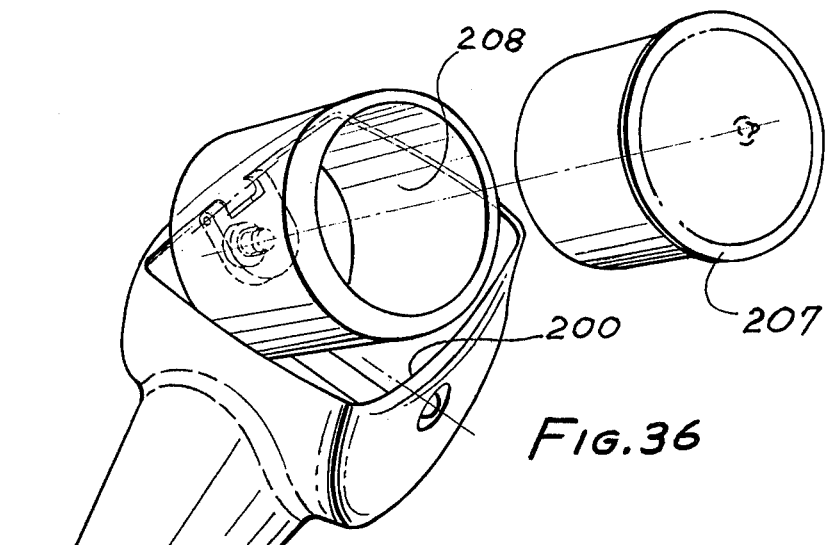
FIG. 36 is an exploded view in perspective showing yet another embodiment of the invention.

The food dispensing utensil of the present invention is a device which permits dispensing of individual servings of a food product, and is generally illustrated in FIG. 1. The utensil is comprised of a cup 10 having a integrally formed handle 12, permitting the utensil to be easily held in the hand. A ring 14 is rotatably supported in cup 10 on pivots 16 and 18. The utensil has a general appearance quite suggestive of an ice cream cone.

As can be seen by reference to FIGS. 3 through 7, handle 12 is in the shape of a truncated cone which fairs into and supports cup 10. Cup 10 has a "hooded" appearance the topmost lip 10a of which acts as a barrier to accumulated food, which would otherwise fall off the cup, particularly food supplied by pressure feed and which is not consumed because of its excessive supply build-up. It is open on one side and forms a trough 13 at the bottom. Cylindrical ring 14 receives two round containers 22 and 24 in a cavity 26. These containers can hold various liquid or dry mix food products such as soup, chocolate drink, ice milk mix, chocolate sauce, or frozen drink mixes, for example. Food containers 22 and 24 have dimples 28 and 30 for engagement with pivots 16 and 18 in the sides of the cup 10. Pull tabs 32 and 34 are provided on the sides of the containers 22 and 24 to keep the contents in the containers, and to release them into the bottom of the cup 10 when removed.

Containers 22 and 24 are first fitted into the cavity 26 in ring 14, and the assembly of the containers and ring is then snapped onto pivots 16 and 18. This loosely supports the ring so that the containers and ring are free to rotate, with part of the outer wall of the ring in the trough so it will pick up liquid therein.

Ring 14 is preferably a double walled, hollow construction forming an annular sealed chamber which can contain a freezeable long-time period, temperature-holding media such as the well-known freezable mixture known as "Blue Ice," or any other substance with a high specific heat. Some materials may be heated instead of chilled. Water may be used within the hollow walled ring instead, but it is less effective than the combination with "Blue Ice" for frozen foods, but may be preferable for foods to be served warm.

More details of the construction and operation of ring 14 can be seen in FIGS. 8 through 10. Ring 14, as was stated previously, preferably has a hollow walled construction forming a sealed chamber 36 in which a high specific heat medium is contained.

The outer perimeter of the ring has a plurality of depressions equidistantly spaced apart for gathering food product from the trough at the bottom of the cup 10, and also to enable the tongue to make a driving connection with the ring, as shown in FIGS. 8 and 9. This is the presently-preferred means for driving the rings. The depressions 38 are constructed to take advantage of the maximum muscular leverage force which is located at the tip of the tongue 40. Considerable dexterity and manipulative capabilities exist in the tip of the tongue. The diameter, depth and overall shape of depressions 38 are selected to conform generally to the shape of the tip of an average tongue 40.

Although the tongue's surface has the ability to collect and withdraw liquid from an external surface because it has hundreds of individual, tactile "buds," the tongue is unsuitable to cause a smooth, cylindrical freeze ring to rotate in a reservoir of liquid frosty cream mix and chocolate sauce. Because the flat, licking area of the tongue could not be exploited as the entire driving force for the ring, the tip of the tongue was observed where not only the maximum muscular leverage force is concentrated, but where considerable dexterity and manipulative capability occurs. By a series of experimental trials a specially shaped depression conforming to the tongue's tip form (in several of its configurations) has been developed with a forward rim edge whose radius is 0.0625"±0.0300" and whose trailing rim (in normal freeze ring rotation) is 0.2500"±0.0320". The depth of the depression is ideally about 0.250", and the depression's diameter is about 0.625".

It is observable that the licking process involves both the tongue and the lower lip 42. The nearest rim of the cup (FIGS. 4 and 6) is designed to stand about 10° below the center of rotation of the ring. This permits accommodation of the lower lip so it can follow through and contact the ring after the tongue 40 completes its upward and forward sweeping motion over the freezer ring surface to lick it and to rotate the ring.

Ring 14 may be constructed of plastic, or of plastic coated aluminum. While experiments show that metal conducts cold temperatures faster than plastic it has been determined that plastic has a better tactile feeling to the sensitive tongue.

In use, containers 22 and 24 (sometimes called "mix packs") containing food products are placed under refrigeration so as to be cooled to about 40° if the product to be served is to be frozen or congealed. The products do not freeze at this temperature, but it requires less calories to freeze or congeal the ultimate product than if it is not pre-cooled. The viscous drag of some thick sauces, syrups and semi-liquids might sometimes restrict free rotation of the ring 14 by the tongue's action to the point where the fingers or some other means must assist. However, conventional commercially available liquid ice milk, ice cream and fountain sauces such as chocolate sauce generally flow freely at 40° F. or above, and this therefore represents a reasonable recommended pre-cooled temperature. Ring 14 itself can conveniently be placed in the freezer section of a refrigerator and chilled to approximately 0° F. before use. Ring 14 and containers 22 and 24 may then be assembled as shown in FIG. 5. The containers 22 and 24 fit into cavity 26 of the ring 14. This assembly is then snapped into place in the sockets 16 and 18. The pull tabs 32 and 34 are removed, and the ring 14 rotated several complete revolutions by the tongue 40 or by finger action. The food products will gradually flow into the trough, and will freeze in a thin layer on the surface of the ring 14. As the tip of the tongue 40 and lower lip 42 rotate the ring by engaging the depression 38 in the cylindrical surface of the ring 14, the food product, perhaps ice milk mixture, produces a frozen or congealed layer on the ring which is soon overlaid by a frosty, creamy and oozy layer atop it. This is an ideally textured product.

The material on the surface of ring 14 where exposed may then be consumed by licking on it, and more is obtained by propelling the ring with the tongue.

The freezeable medium in the chamber 36 keeps the freezing ring temperature sufficiently cold to produce a frozen or congealed layer of material for a sufficient length of time to allow the food product to be completely consumed. The amount of material in the ring of course determines the amount which can be frozen or congealed. The temperature will remain cold longer if a warm tongue is not continuously contacting the frozen dessert layer.

Water may suffice as the freezeable media in the chamber 36 but it is less desirable because its expansion when frozen could unduly stretch the freezer ring 14. A freezable gel such as "Blue Ice" does not expand so much, and is more suitable.

In addition to the viscous dragging effect which causes material to freeze to and adhere to and flow over the surface of ring 14, there is also something resembling a "pumping" action. This is because the lip 44 nearest the front is disposed at a pre-determined distance "D" of approximately 3/32 to 3/16 inches from the surface of the ring, and additional material "attaches" itself to the frozen layer and tracks along with it. As the liquid layer nearest the ring surface freezes, it builds up another somewhat congealed layer which further occludes the flow space between the ring and the cup wall. This permits liquid to move only in the direction of rotation. The distance between the cup wall and the ring surface is designed to aid in this process. This process will function most efficiently when little or no open space remains, and the system becomes a closed-continuous feed fluid pump circuit path. This uni-directional flow mechanism and process prevents "run back" of the reservoir liquid supply, thereby providing a continuous-feed design.

Heated materials can be dispensed with remarkably similar results.

As an optional feature, the utensil is able to accommodate a pressurized container so that a third material can be dispensed into the trough. This feature is illustrated in FIGS. 11 and 12. In these Figs., cup 10 has a neck or ring portion 11 into which a pressurized container 46 can snap for attachment. A trigger 48 is provided on the container for releasing its contents, perhaps whipped cream, into a nozzle 50 for dispensing through passageway 52 into the trough or reservoir. Thus the utensil can provide another product supply by pulling the finger actuator trigger 48 on the valve.

The way in which the embodiments of the invention can be laid down on a surface when not in use is illustrated in FIGS. 13 and 14. In FIG. 13, the handle and cup 10 are shown laid on their side, and the cup 10 has sufficient capacity to prevent leakage of the liquid because of its design. The second embodiment with the pressurized can of food product or whipped cream 46 permits the device also to be put down to rest on its side with the cup 10 in the position shown to prevent spilling.

This invention affords numerous other advantages, and is susceptible to many variations in basic constructions, surface textures, and alternate and additional usages.

For example, in FIGS. 15-17, a ring 100 is shown with round lugs 101 on its surfaces. These act somewhat as cleats not only to pick up the product in the cup, but also to provide different means for the tongue to engage and to drive the ring. These round lugs can readily be formed as part of the outer "skin" 102 of the ring. The inner skin 103 serves, with the outer skin, to enclose a chilling medium as already described.

FIGS. 18-20 show ring 105 with inner skin 106, outer skin 107 and V shaped cleats 108.

FIGS. 21-23 show a ring 110 with inner skin 111, outer skin 112 and bar-shaped cleats 113.

FIGS. 24-26 show a ring 115 with inner skin 116, outer skin 117 and recessed dimples 118.

FIGS. 27-29 show a ring 120 with inner skin 121, outer skin 122 and brush-like follicles 123.

In all of FIGS. 15-29, a heat-retention material may be enclosed between the skins.

FIGS. 30 and 31 show a ring 130 with an outer split circlet 131 which can have any desired surface treatment, clasped around a sub-ring 132 which has heat-retentive properties as already described.

FIG. 32 shows another means for propelling a ring in the cup. In this embodiment, a cup 140 has a handle 141, and an opening 142. A ring 143 according to any embodiment is journaled in the cup. A ratchet arm 144 is mounted to the handle, and has a spring-like finger 145 which can engage in notches 146 in the surface of the ring. A plunger 147 that is spring-loaded by spring 148 can be depressed to pull down the finger and incrementally rotate the ring. Reverse movement of the plunger steps the ratchet.

FIG. 33 shows that if more than one container is provided, the containers need not be of equal volume. In this device container 160 is smaller than container 161. This may be useful when a dry mix is used, and a large amount of water must be added to container 161. To assist in mixing the dry mix with water, a splined shaft 162 may be stored in handle 163 of the utensil, and when needed, can be removed from the handle, inserted into a splined socket 164 in the container, and spun back and forth to twirl the container and mix the contents. The same ports and seals are provided for closing the container and enabling it to be opened for removal of the container. Any ring 166 according to the invention may be used.

FIG. 35 shows a utensil 170 with a cup 171, handle 172, and ring 173 like the previous embodiments. What is added is a mixer mechanism 175 in the bottom of trough 176. A mixer blade 177 like a propeller is journaled in the bottom of the trough. A pinion gear 178 is mounted to shaft 179 to which the blade is fixed. A rack, 80 is engaged to the pinion gear, and is spring-loaded to the right in FIG. 35 by bias spring 181. A pivoted trigger 182 is pined to the rack, so that the mixer blade will be bi-directionally rotated when the trigger is pressed and then released.

Figures 37, 38, 39:
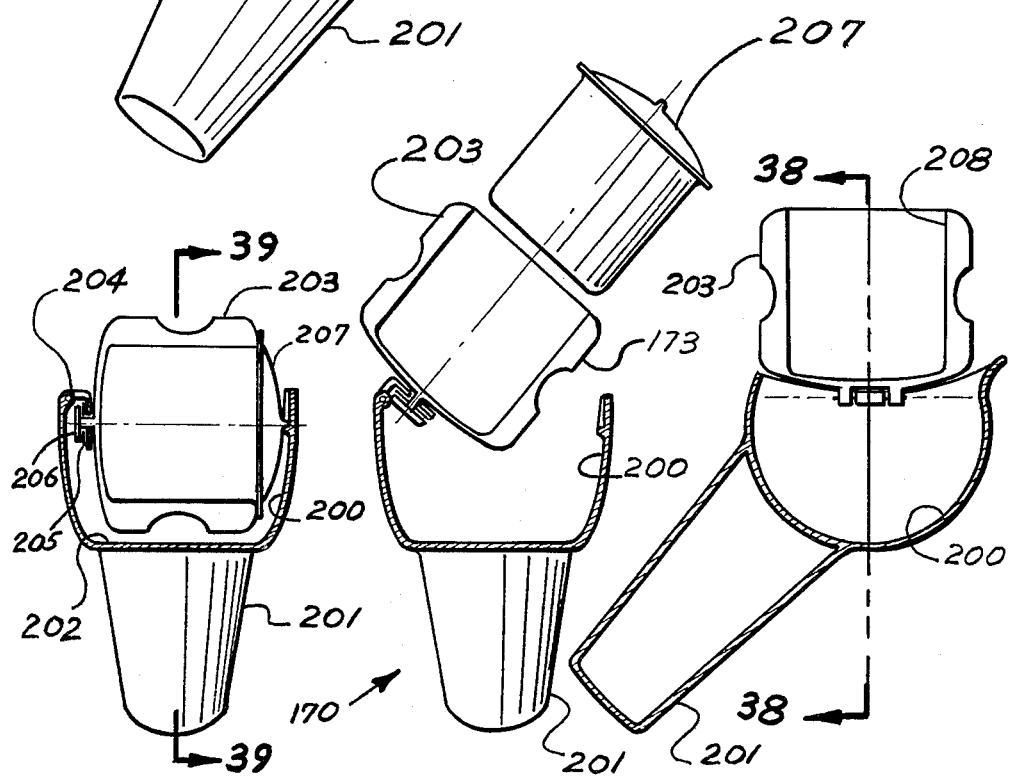
FIGS. 37 and 38 are views taken along line 38—38 in FIG. 39 showing the device of FIG. 36 in two operating conditions.
FIG. 39 is an axial cross-section taken at line 39—39 in FIG. 37.

FIGS. 36-39 show a construction where the ring can be permanently joined to the cup. Cup 200 and handle 201 are provided. Trough 202 receives ring 203. The ring is any one of the foregoing embodiments. However, a hinge 204 mounts a journal 205 to which a stud 206 is engaged at one end of the ring. Container 207 is pressed into cavity 208 in the ring. As can be seen from FIGS. 37 and 38, the ring can be hinged into and out of the trough. The container can be inserted and removed when the ring is in the position shown in FIG. 38. Then the ring can be snapped into the operating position of FIG. 37.

In all embodiments, the cup and/or the container or ring are so flexible that the containers and rings can be snapped into the operative position.

When the foods are to be served hot or warm the containers will be warmed in oven or in a water bath, and the ring will be heated to a desired temperature. The food will be heated fairly near to the desired serving temperature, and the ring to a temperature somewhat above that temperature, but not disagreeably so. The ring then acts as a means to present the food in the air to the tongue at an optimum, agreeable temperature for a considerable period of time. The exposed surfaces from which heat will radiate are not excessive, and the unit will maintain the serving temperature because of the heat in the food and in the ring.

One of the advantages of this invention is that it can serve food at a preferred viscosity. Foods such as ice milk mix, pea soup, and the like, are best enjoyed when their viscosity (directly related to temperature) is at some respective optimum valve. The heat content in the ring aids in maintaining this optimal condition because viscosity is quite proportioned to temperature.

Thus there has been disclosed a food dispensing utensil which is simple to use for dispensing a variety of food products and which is suitable for dispensing both warm, chilled, and frozen products. The device can dispense food products by simply inserting one or more containers into the ring, opening the container, and rotating the ring in the food in the cup. The food dispensing utensil is much less messy than cones because it can be laid down as illustrated in FIGS. 13 and 14 without spilling. Further, the utensil can dispense any liquid, semi-liquid, semi-frozen, cold, warm or hot food, and even powder mixes to be added to water. Further the food dispensing utensil of the present invention may fill the needs of very young children, and hospital patients.

If desired, a removable cover can be snapped onto the opening of the cup to store the material and to keep the utensil clean.

While the preferred configuration for the dispensing surface of the ring is a cylinder, it will be understood that any other suitable shape could be used so long as it tracks through the material in the trough, and can be driven in it.

It is evident that only one container need be supplied, and that if more than one is supplied, the same product can be placed in both, or different products in each.

This invention is not to be limited by the embodiments shown in the drawings and described in the description which are given by way of example and not of limitation, but only in accordance with the scope of the appended claims.

I claim:

1. A food dispensing utensil comprising: a cup forming a trough; a handle on said cup; a ring rotably supported in said cup, said ring having a cavity to receive a container means containing material to be dispensed, said ring then encircling said container means, said material entering said trough when exiting from said container means, said ring having a peripheral surface at least part of which is from time to time in the trough, thereby to make contact with said material in said trough.

2. A food dispensing utensil according to claim 1 wherein said ring comprises a hollow cylinder having a central cavity therein, said cylinder having a substantial wall construction including a substance having a substantial specific heat.

3. A food dispensing utensil according to claim 2 in which said wall construction includes a pair of walls forming an annular space between them, and in which a relatively high-specific heat material is placed in said space.

4. A food dispensing utensil according to claim 2 wherein said ring is rotatably supported by said cup.

5. A food dispensing utensil according to claim 3 wherein said ring is rotatably supported by said cup.

6. A food dispensing utensil according to claim 4 wherein one of said cup or container means has pivot means for pivotal engagement with the other.

7. A food dispensing utensil according to claim 5 wherein one of said cup or container means has pivot means for pivotal engagement with the other.

8. A food dispensing utensil according to claim 1 wherein said cup includes: attaching means for attaching a pressurized can of food product; and trigger means for triggering the release of the canned pressurized food product into the trough of said cup.

9. A food dispensing utensil according to claim 8 wherein said pressurized can also comprises a handle for said cup.

10. A food dispensing utensil according to claim 1 in which said container has an opening, and a removable closure means closing said opening to retain the material therein.

11. A food dispensing utensil according to claim 1 in which the external surface of said ring includes declivities of depth and size to receive the tip of a tongue for rotating the ring.

12. A food dispensing utensil according to claim 1 in which the external surface of said ring is dimpled.

13. A food dispensing utensil according to claim 1 in which the external surface of said ring bears a plurality of raised lugs.

14. A food dispensing utensil according to claim 1 in which the external surface of said ring bears a plurality of raised bars.

15. A food dispensing utensil according to claim 1 in which the external surface of said ring bears a plurality of cleats.

16. A food dispensing utensil according to claim 1 in which the external surface of said ring bears a plurality of follicles.

17. A food dispensing utensil according to claim 1 in which the ring bears an external circlet.

18. A food dispensing utensil according to claim 1 in which mechanical linkage means is mounted to said utensil for rotating said ring.

19. A food dispensing utensil according to claim 1 in which ratchet means drivingly interconnects said cup and said ring for incrementally rotating said ring.

20. A food dispensing utensil according to claim 1 in which a rotatable shaft is provided which is engageable to one of said containers to engage and spin said container to mix material therein.

21. In combination: a utensil according to claim 1, and a container making a close fit in a cavity in said ring.

22. A combination according to claim 1 in which said container is made of metal.

23. A food dispensing utensil according to claim 1 in which mixer means is disposed in said trough, and in which exterior actuation means is provided for rotating said mixer means.

24. A food dispensing utensil according to claim 1 in which one end of said ring is hinged to said cup, whereby said ring can be hinged to expose its other end for reception or removal of a container.

25. A food dispensing utensil according to claim 1 in which two of said containers are provided, one of which has an axial socket, and a shape for insertion into said socket to engage and rotate said container.

26. A method of dispensing food comprising: dispensing a food into a trough shaped utensil; contacting said food with a rotatable ring to transfer said food product to the surface of said ring; and rotating said ring whereby said food may be continuously transferred from said trough to the mouth.

27. The method according to claim 26 including pre-chilling said rotatable ring, and dispensing a chilled food into said trough whereby said pre-chilled ring causes said chilled food to coat said ring with congealed layer of said food product.

28. The method according to claim 26 wherein the step of rotating said ring is at least in part accomplished by driving contact with the tongue.

29. The method according to claim 26 including pre-heating said rotatable ring, and dispensing a warmed food into said trough whereby to coat said ring with said material, said ring tending to maintain the temperature of the food.

30. The method according to claim 26 including either a pre-chilled or pre-heated said rotatable ring, and dispensing a soluble dry powdered food and a portable, hot or chilled liquid into said trough whereby said pre-chilled or said pre-heated ring causes said soluble dry powdered food and potable, hot or chilled liquid to intermix and to coat said ring with a congealed or viscous layer of said intermixed food product.

31. The method according to claim 26 including a finger trigger pulling linkage operating a ratchet means for rotating said rotatable ring whose facility to rotate is inhibited by excessively viscous food but which can be rotated by said ratchet means.

32. The method according to claim 31 including mixing and whipping of the soluble powdered food and a potable liquid by means of a mechanical agitator whipper in the cup base the activation of which is accomplished by finger trigger-pulling linkage is attached to, and causing rotation of, the mechanical agitator-whipper.

33. The method according to claim 24 wherein the step of rotating said ring is at least in part accomplished by driving contact with the tongue.

34. The method according to claim 26 wherein the step of rotating said ring is at least in part accomplished by driving contact with the tongue.

* * * * *